United States Patent [19]

Ganesan et al.

[11] Patent Number: 5,588,061
[45] Date of Patent: Dec. 24, 1996

[54] SYSTEM AND METHOD FOR IDENTITY VERIFICATION, FORMING JOINT SIGNATURES AND SESSION KEY AGREEMENT IN AN RSA PUBLIC CRYPTOSYSTEM

[75] Inventors: Ravi Ganesan, Arlington, Va.; Yacov Yacobi, Berkeley Heights, N.J.

[73] Assignees: Bell Atlantic Network Services, Inc., Arlington, Va.; Bell Communications Research, Inc., Livingston, N.J.

[21] Appl. No.: 277,808

[22] Filed: Jul. 20, 1994

[51] Int. Cl.$^6$ ................................................ H04L 9/30
[52] U.S. Cl. .................... 380/30; 380/49; 380/21
[58] Field of Search ........................ 380/30, 21, 48, 380/49

[56] References Cited

U.S. PATENT DOCUMENTS

| | | |
|---|---|---|
| 4,200,770 | 4/1980 | Hellman et al. . |
| 4,218,582 | 8/1980 | Hellman et al. . |
| 4,405,829 | 9/1983 | Rivest et al. . |
| 4,424,414 | 1/1984 | Hellman et al. . |
| 4,736,423 | 4/1988 | Matyas ............................ 380/23 |
| 4,995,082 | 2/1991 | Schnorr . |
| 5,276,737 | 1/1994 | Micali .............................. 380/30 |
| 5,299,263 | 3/1994 | Beller et al. ..................... 380/30 |
| 5,375,169 | 12/1994 | Seheidt et al. ................... 380/21 |

OTHER PUBLICATIONS

R. L. Rivest et al., "A Method for Obtaining Digital Signatures and Public-Key Cryptosystems", CACM, vol. 21, pp. 120–126, Feb. 1978.

M. J. Wiener, "Cryptanalysis of Short RSA Secret Exponents", IEEE Transaction on Information Theory, vol. 36, No. 3, pp. 553–558. May 1990.

C. Boyd, Cryptography and Coding: "Digital Multisignatures", 15–17 Dec. 1986, pp. 241–246.

Bruce Schneier, "Applied Cryptography" John Wiley & Sons, 1994, Chap. 3.4 and 16.3 and p. 576.

Primary Examiner—Gilberto Barrón, Jr.
Attorney, Agent, or Firm—Lowe, Price, LeBlanc & Becker

[57] ABSTRACT

A method for improving an RSA cryptosystem by generating a user private exponent key, having an associated modulus N, and a user public exponent key for each user of the system. Each user's public exponent key is provided to all users of the system. Each user's private exponent key is divided into a two user key portions. A first user key portion is maintained exclusively by the user for whom the associated private exponent key was generated. A second user key portion is entrusted to one or more other users of the RSA system. The bit length of the first user key portion is no greater than fifteen percent of the bit length of the associated modulus N but not less than 56 bits. The two portions of the private exponent key may be used by two users to exchange two numbers, the product of which is used as a session key to secure communications between the two users. The portions of the private exponent key may also be used by different users to verify the identity of each to the other. Additionally, the portions of the private exponent key can be used to form joint signatures on documents.

43 Claims, 4 Drawing Sheets

SYSTEM AND METHOD FOR IDENTITY VERIFICATION, FORMING JOINT SIGNATURES AND SESSION KEY AGREEMENT IN AN RSA PUBLIC CRYPTOSYSTEM

BACKGROUND OF INVENTION

1. Field of the Invention

This invention relates to Rivest, Shamir and Adleman (RSA) public cryptosystems and more particularly to an improved system and method for identity verification, forming joint signatures, and session key agreement in an RSA type system.

2. Description of the Related Art

Encryption systems have been developed for maintaining the privacy of information transmitted across a communications channel. Typically, a symmetric cryptosystem is used for this purpose. Symmetric cryptosystems, which utilize electronic keys, can be likened to a physical security system where a box has a single locking mechanism with a single key hole. One key holder uses his/her key to open the box, place a message in the box and relock the box. Only a second holder of the identical copy of the key can unlock the box and retrieve the message. The term symmetric reflects the fact that both users must have identical copies of the key.

In more technical terms, a symmetric cryptosystem uses an encryption function E, a decryption function D, and a shared secret-key, K. The secret-key is a unique string of data bits to which the functions are applied. Two examples of encipherment/deencipherment functions are the National Bureau of Standards Data Encryption Standard (DES) and the more recent Fast Encipherment Algorithm (FEAL). To transmit a message, M, in privacy, the sender computes M=E (C,K), where C is referred to as the ciphertext. Upon receipt of C, the recipient computes M=D (C,K), to recover the message M. An eavesdropper who copies C, but does not know K, will find it practically impossible to recover M. Typically, all details of the enciphering and deciphering functions, E and D, are well known, and the security of the system depends solely on maintaining the secrecy of key, K. Conventional symmetric cryptosystems are fairly efficient and can be used for encryption at fairly high data rates, especially if appropriate hardware implementations are used.

Asymmetric cryptosystems, often referred to as public key cryptosystems, provide another means of encrypting information. Such systems differ from symmetric systems in that, in terms of physical analogue, the box has one lock which accepts different keys. One key can be used to unlock the box to retrieve a message which has been locked in the box by the other key.

In public key electronic cryptosystems, each entity, for example, x and y, has a private key, d, which is known only to the entity, and a public key, e, which is publicly known. Once a message is transformed with a user's public-key, it can only be inverted using that user's private-key, and conversely, if a message is transformed with a user's private-key, it can only be inverted using that user's public-key. So, if sender X wishes to send a message to receiver Y, then x, "looks-up" y's public key e, and computes $M=E(C,e_y)$ and sends it to y. User y can recover M using its private-key $d_y$, by computing $M=D(C,d_y)$. An adversary who makes a copy of C, but does not have $d_y$, cannot recover M. However, public-key cryptosystems are inefficient for large messages.

Public-key cryptosystems are quite useful for digital signatures. The signer, x, computes $S=D(M, d_x)$ and sends [M,S] to y. User y "looks-up" x's public-key $e_x$, and then checks to see if $M=D(S,e_x)$. If it does, then y can be confident that x signed the message, since computing S, such that $M=D(S,e_x)$, requires knowledge of $d_x$, x's private key which only x knows.

Public-key cryptography also provide a convenient way of performing session key agreement, after which the key that was agreed upon can be used for symmetric encryption. Typically, the key being exchanged is used during the course of a particular communication session and then destroyed, though this can vary depending on the application.

One public key cryptographic system is the Rivest, Shamir, Adleman (RSA) system, as described in Rivest, Shamir and Adleman, "A Method of Obtaining Digital Signatures and Public Key Cryptosystems, CACM, Vol 21, pp 120–126, February 1978. RSA is a public-key based cryptosystem that is believed to be very difficult to break. In the RSA system the pair $(e_i,N_i)$, is user i's public-key and $d_i$ is the user's private key. Here $N_i=pq$, where p and q are large properly chosen primes. Here also $ed=1 \bmod \phi(N_i)$, where $\phi(N_i)=(p-1)(q-1)$ which is the Euler Totient function which returns the number of positive integers less than $N_i$, that are relatively prime to $N_i$. A Carmichael function is sometimes used in lieu of a Euler Totient function.

To send a message to user j, user i can compute $C=M^{(e_j)} \bmod N_j$ and send C to user j. User j will then perform $M=C^{(d_j)} \bmod N_j$ to recover M. Alternatively, user i could sign the message using his private key. The RSA based signature of user i on the message, M, is $M^{d_i} \bmod N_i$. The recipient of the message, user j, can perform $(M^{(d_i)} \bmod N_i)^{(e_i)} \bmod N_i$, to verify the signature of i on M.

In a typical mode of operation, i sends j, $M^{(d_i)} \bmod N_i$ along with M and a certificate $C=(i,e_i,N_i)^{d_{CA}} \bmod N_{CA}$, where C is generated by a Certification Authority (CA) which serves as a trusted off-line intermediary. User j can recover i's public key from C, by performing $C^{(e_{CA})} \bmod N_{CA}$, as $e_{CA}$ and $N_{CA}$ are universally known. It should also be noted that in an RSA system the encryption and signatures can be combined.

Modifications to RSA systems have been proposed to enable multi-signatures to be implemented in a manner which only requires a single RSA transformation. The proposed approach extends the RSA system by dividing the user private key d into two portions, say $d_i$ and $d_j$, where $d_i * d_j = d \bmod \phi(N)$. Such a proposal is described in Digital Multisignature, C. Boyd, Proceedings of the Inst. of Math, and its Appl. on Cryptography and Coding, 15–17 December 1986.

However the problem remains that conventional RSA systems, including those modified as proposed, require that the secret exponent key d of a user be quite long. In the case where the secret exponent d is less than a quarter of the length of the modulus N, RSA is insecure, because it is too easy to invert the public operation without the secret key. Such a conclusion is discussed in M. J. Wiener "Cryptoanalysis of short RSA Secret Exponents, IEEE Trans. on IT, May 1990, Vol. 36, No. 3, pp. 553–558. Thus, according to Wiener, if the modulus N is 512 bits long, the secret exponent should have at least 128 bits. Accordingly, conventional RSA systems are not suitable for use in systems that do not provide a way to store the secret exponent key d. e.g. in situations where the user has to memorize the secret exponent. This, for example, is the case when smart cards for storing the secret exponent are not widely available or when the user accesses the distributed system via a dumb terminal that does not have a disk drive for storing the secret exponent. Additionally, conventional RSA systems do not provide a way to establish and distribute session keys using split private keys.

Therefore, it is an object of the present invention to provide a system and method for improving conventional RSA public cryptosystems so that the user is only required to use a short secret key while the system provides security as high as that of conventional RSA systems.

It is another object of the invention to provide a system and method for improving conventional RSA cryptosystems such that the identity of the user can be verified when the user is using a short secret key.

It is a further object of the invention to provide a system and method for improving conventional RSA cryptosystems such that joint signature of documents by two or more users is facilitated using a short secret key of a user.

It is a still further object of the present invention to provide a method and system to improve conventional RSA cryptosystems so that session key agreement can be accomplished using split private keys.

Additional objects, advantages and novel features of the present invention will become apparent to those skilled in the art from the following detailed, as well as by practice of the invention. While the invention is described below with reference to preferred embodiments, it should be understood that the invention is not limited thereto. Those of ordinary skill in the art having access to the teachings herein will recognize additional applications, modifications and embodiments in other fields which are within the scope of the invention as disclosed and claimed herein and with respect to which the invention could be of significant utility.

SUMMARY OF THE INVENTION

The present invention provides a method and system for improving an RSA cryptosystem by generating a private exponent key having an associated modulus N and a corresponding public exponent key for a user or user group within an RSA system.

The public exponent keys are typically disclosed to all users of the system. Each private exponent key is divided into a first key portion and a corresponding second key portion. According to one aspect of the invention the bit length of the first key portion is no more than fifteen percent of the bit length of the associated modulus N but not less than 56 bits. For example, for a modulus N which is 512 bits in length, the first key portion is preferably between 56 to 72 bits in length. The first key portion is normally disclosed only to a single user. The second key portion is disclosed to one or more selected other users of the RSA system depending on the application. A message transformed by the first key portion can only be recovered by applying the corresponding second key portion and public exponent key. Likewise, a message transformed by the second key portion can only be recovered by applying the corresponding first key portion and public exponent key.

According to another aspect of the invention, the second key portion of a first user's private exponent key is disclosed to a second user. The first user generates a message and transforms the message with the first key portion to form a transformed message. The transformed message is transmitted to the second user. The second user recovers the message by applying the corresponding second key portion and first user's public exponent key to the transformed message. If the message has been properly recovered, e.g. the message is readable or corresponds to another message provided with the transformed message, the second user has verified that the message was transformed with the first user's first key portion and thus sent by the first user.

To form joint signatures on a message, a first user signs, i.e. transforms, a message using a first key portion. The corresponding second key portion is applied by a second user to the signed, i.e. transformed, message received from the first user. The application of the second key portion by the second user serves as a second signature on the message. This jointly signed message is then transmitted to a third user of the RSA system. The third user will be able to verify the joint signatures on the message by applying only the public exponent key associated with the first and second key portions to invert the jointly signed message.

In accordance with another aspect of the invention, the second user generates a second message and transforms it with the second key portion and public exponent key. The transformed message is transmitted to the first user. The first user recovers the message by applying the first key portion to the transformed message. If the message has been properly recovered, the first user has verified that the message was signed by the second user.

In accordance with a further aspect of the present invention, a session key agreement is established by generating a private exponent key and a corresponding public exponent key for a first and second user of the RSA system. The public exponent key is disclosed to first and second users. The public exponent key may also be disclosed to other users of the system if so desired. The private exponent key is divided into a first key portion and a corresponding second key portion. The first key portion is disclosed only to the first user. The second user key portion is disclosed only to a second user. The first user generates a number and transforms it with the first key portion to form a first transformed number. The first transformed number is transmitted to the second user. The second user recovers the first transformed number by applying the second key portion and the public exponent key to the first transformed number. The second user generates a second number and transforms it with the second key portion and the public exponent key to form a second transformed number. The second transformed number is transmitted to the first user. The first user recovers the second number by applying the first key portion to the second transformed number. The first and second numbers are now known to both users. The product of these numbers can be computed by both users to establish a session key which can be used by the two users to secure communications between them. Thus, agreement on a session key is obtained.

The improved RSA public cryptosystem of the present invention includes a security processor for generating a user private exponent key having an associated modulus N and a corresponding user public exponent key for one or more users of the RSA system. The public exponent key is preferably stored on a system storage device, such as a network server. The security processor divides the private exponent key into two portions. In accordance with one embodiment of the invention, one portion of the private exponent key, which will be referred to as the first portion, and the associated modulus N have bit lengths in a ratio of no greater than fifteen percent but not less than 56 bits. Preferably, the length of the first portion of the private key is 56 to 72 bits. The second portion of the private key is stored on a device which allows only selective access to the stored private key portion.

A user station, which preferably includes a processor, is used to transform messages by applying the first portion of the applicable user's private key to the message. After a message has been transformed, it is transmitted to, for example, a system server or another user station.

After receipt of the transformed message, the server or station retrieves the second portion of the private key and public exponent key from storage. The server or station then recovers the message by applying the retrieved second portion of the private key and the public exponent key to the transformed message.

The server or station is also capable of transforming messages by retrieving and applying the second portion of the private key and the public exponent key to a message. The user station storing the first private key portion can recover the message by applying the first portion of the private key to the transformed message.

The system will normally also include communication devices and links for transmitting and receiving messages. The stations, servers and other devices used in the system will also typically be capable of determining if transformed messages have been properly recovered. Using this capability, the signature of the sender of a transformed message can be verified.

To form joint signatures on a communication, a message is transformed by a first user station with, for example, a first portion of the private key and transmitted to a second user station or server. The station or server retrieves only the second portion of the private key from storage and applies it to the message received from the first user station which has been transformed with the first portion of the private key. This results in the message being jointly signed by two users. This jointly signed message can now be transmitted to another system user's station. This later user station retrieves the associated public key from storage. If the two private key portions have in fact been applied to the message, the message can be inverted and thus recovered by applying the retrieved public key to the jointly signed message.

In another embodiment, a system is disclosed which facilitates session key agreement between users of the system, some of whom may be servers or other system devices. A security processor generates a private exponent key having an associated modulus N, and a corresponding public exponent key, for a user or group of users. The public key is preferably stored in a central network storage device. The security processor divides the private key into two portions. One portion is stored on a device which will allow only selective access to the stored key portion.

The first user's station generates a number upon request of the first user and transforms the number by applying one portion of the private key to the number. This results in a first transformed number which is transmitted to the second user's station. The second user's station retrieves the other portion of the private key and public exponent key from the storage device(s). The second user's station then generates a number and transforms the number by applying the retrieved private key portion and public exponent key to the number. This second transformed number is transmitted to the first user's station.

The second user's station recovers the first number by applying the retrieved second private key portion and public exponent key to the first transformed number. Similarly, the first user's station can recover the second number by applying the first portion of the private key to the second transformed number. Both user's stations now possess both numbers. By multiplying the two numbers, each station can form an agreed session key for its user. The stations next apply the session key to encrypt and decrypt messages transmitted between the users.

According other aspects of this later embodiment, the first private key portion may be developed to have a bit length which is no more than fifteen percent of the corresponding modulus N bit length but not less than 56 bits. In one preferred embodiment, the bit length of one private key portion is limited to between 56 and 72 bits.

According to still further aspects of the invention each private exponent key is comprised of a private exponent and the modulus N which is the product of a plurality of numbers within a set of large prime numbers, and each public exponent key is comprised of a public exponent and the modulus N. The plurality of numbers used to compute the modulus N are not known to users of the system.

It will be understood by those familiar with RSA and other cryptosystems that the public exponent key could be applied by a user having access to either portion of the private exponent key without affecting the security of the system or deviating from the scope of the disclosed invention.

PREFERRED EMBODIMENT OF THE INVENTION

The present invention provides a system and method for improving conventional RSA cryptosystems using a joint signature protocol in which two (or more) parties must collaborate in order to compute the digital signature. No single party can compute such a signature independently. The system and method extend the RSA public-key cryptosystem in a manner which guarantees that cracking the improved system is equivalent to cracking conventional RSA systems. The invention is particularly suited to cases in which one of the parties is a central network server with which a user must interact. The presence of such a server has several important administrative benefits including a central point for auditing and instant key revocation.

Figure 1:
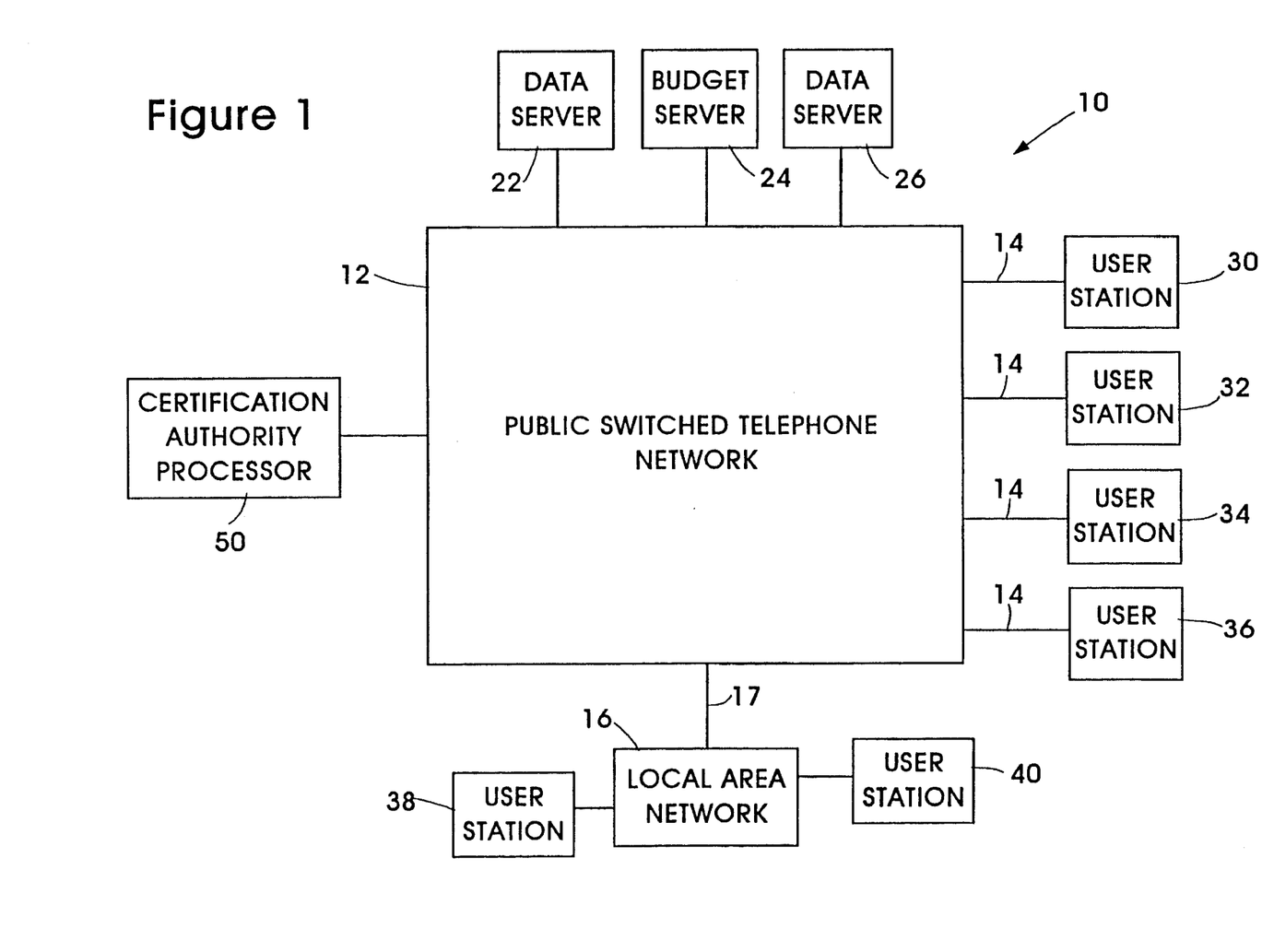
FIG. 1 illustrates an RSA system in accordance with the present invention.

FIG. 1 schematically illustrates a distributed RSA public cryptosystem 10 in accordance with the present invention. The distributed system 10 includes a communications network 12. A plurality of user stations, 30–40, are connected to the network 12. If, for instance, the network 12 is the public switched telephone network, the user stations 30–36 could be connected to network 12 via the subscriber lines 14. Another group of user stations, 38 and 40, are connected to the network 12 by the local area network (LAN) 16. The LAN 16 may, for example, be an Ethernet, token ring network or FDDI network. The LAN 16 is itself connected to the network 12, by a subscriber line 17. The user stations may be personal computers, work stations, dumb terminals, or any other device capable of inputting data to and/or receiving data from the network 12.

The distributed system 10 also includes a plurality of servers, 22–26. The servers illustratively contain databases which users at the user stations may wish to access. Each server can also serve as a verifier, if desired. Alternatively, a separate server could be used to perform the verification function.

Figure 2:
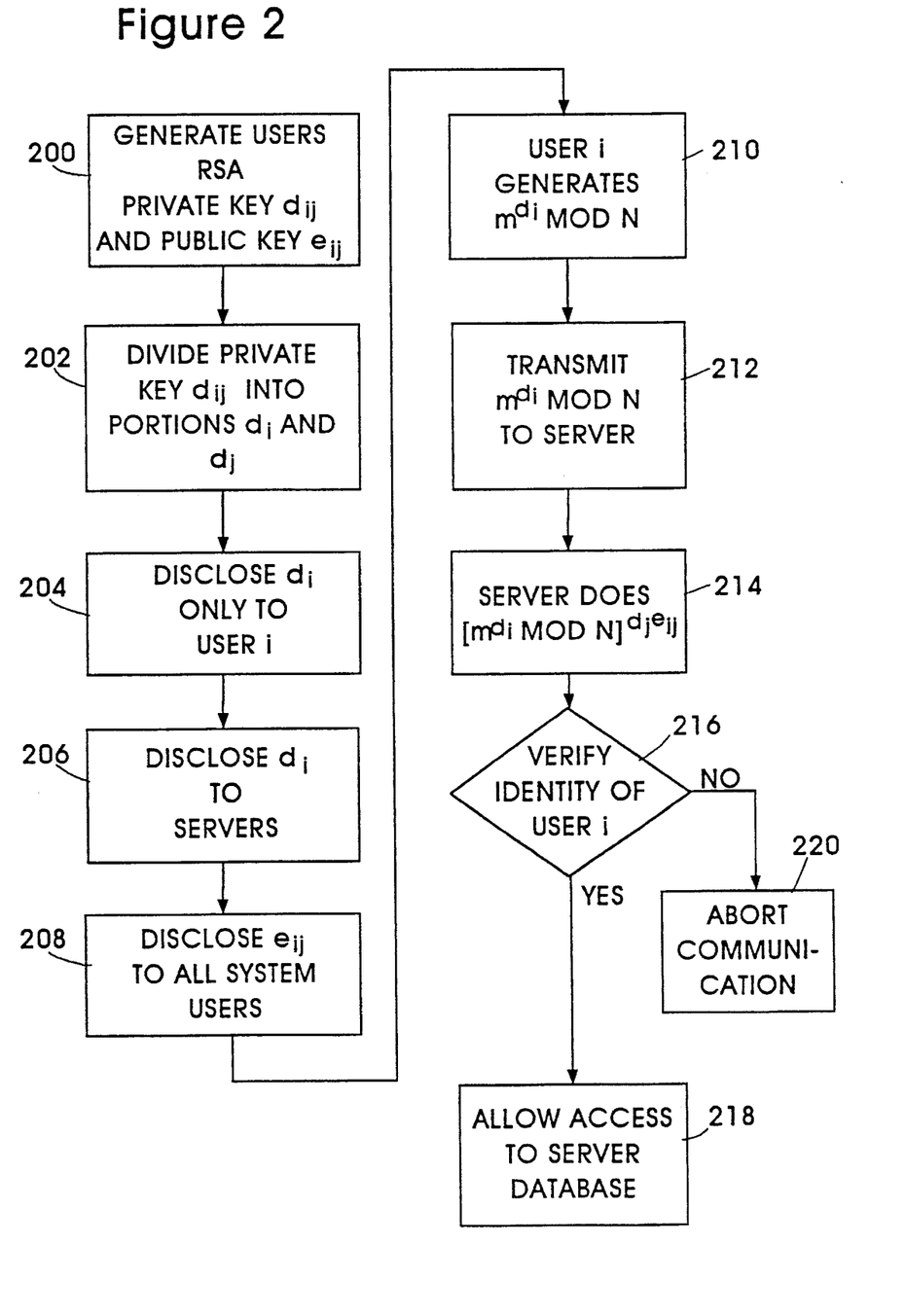
FIG. 2 illustrates party identity verification in accordance with the present invention.

Referring to steps 200–208 of FIG. 2, $e_{ij}$ is the RSA public exponent key of the user i and another user j which could, for example, be servers 22–26. The public exponent key as well as the RSA private exponent key $d_{ij}$ are generated in step 200 such that $d_i d_j e_{ij} = 1 \mod K(N_{ij})$, where $K(N_{ij})$ is either the Carmichael function $\lambda(N)$ or the Euler Totient function $\phi(N)$. The Carmichael function is the least common multiple of (p−1) and (q−1) where N=pq. The Euler Totient function is $\phi(N)=(p-1)(q-1)$. Unlike in conventional RSA systems, neither the user i nor the server j knows the factorization of N (i.e., p and q) or any related function such as $\phi(N)$ or $\lambda(N)$. A certification authority (CA), connected to the system 10 of FIG. 1 by CA processor 50, is the only one who (for a short while) knows p and q while creating, in step 200 and 202, the keys $d_i$, $d_j$ and $e_{ij}$. This factorization is destroyed after the keys are created. The keys are created on processor 50. The private key is divided in step 202 by processor 50 so that the key portion $d_i$ has a bit length which is no longer than fifteen percent of the bit length of the modulus N but not less than 56 bits. Preferably the bit length of $d_i$ is between 56 and 72 bits. Private key portions, $d_i$ and $d_j$, are confidentially and respectively disclosed to user i in step 204 and servers 22–26 in step 206. All system users are provided with public key $e_{ij}$ in step 208.

Consider the case where a first party, e.g., user i, at user station 30, wants to communicate with a second party, e.g. server 22, in order to access a database on the server 22. The user i sends a message to the server 22 informing the server that user i at user station 30 wants to access the database. The server 22 then sends a challenge message m to the user i via network 12 and subscriber line 14.

Verification then proceeds as shown in steps 210–220 of FIG. 2. In step 210, the user i signs the message m using user i's portion of a joint private RSA key $d_i$ to form the signature $s_i = m^{d_i} \mod N_i$, where N=pq is a modulus which is the product of two large primes p and q. The signed message $s_i$ is then, in step 212, sent by station 30 to the server 22. The server, in step 214, forms the jointly signed message $s_{ij} = s_i^{d_j} \mod N$, where $d_j$ is the other portion of private exponent key which has been entrusted to each of the servers 22–26. Next, in step 216, the server verifies that $s_{ij}^{e_{ij}} \mod N = m^{d_i d_j e_{ij}} \mod N_{ij} = m$, using public exponent key $e_{ij}$. If the verification fails, the communication between station 30 and server 22 is aborted as indicated in step 220. If user i's identity is verified, access to the data base is allowed as shown in step 218.

Consider next the case where a first party, e.g., user i, at user station 30, wants to authorize a purchasing agent at station 38 to purchase certain products. The purchasing agent is prohibited from proceeding with the purchase unless the procurement is authorized by both user i and the budget department. The budget department stores budget information on server 24. This joint approval requirement is perhaps to ensure that budgeted funds are available before the requested purchase is made. The user i sends a message from station 30 to the server 24 informing the server that user i at user station 30 wants to authorize the purchase of certain products.

Figure 3:
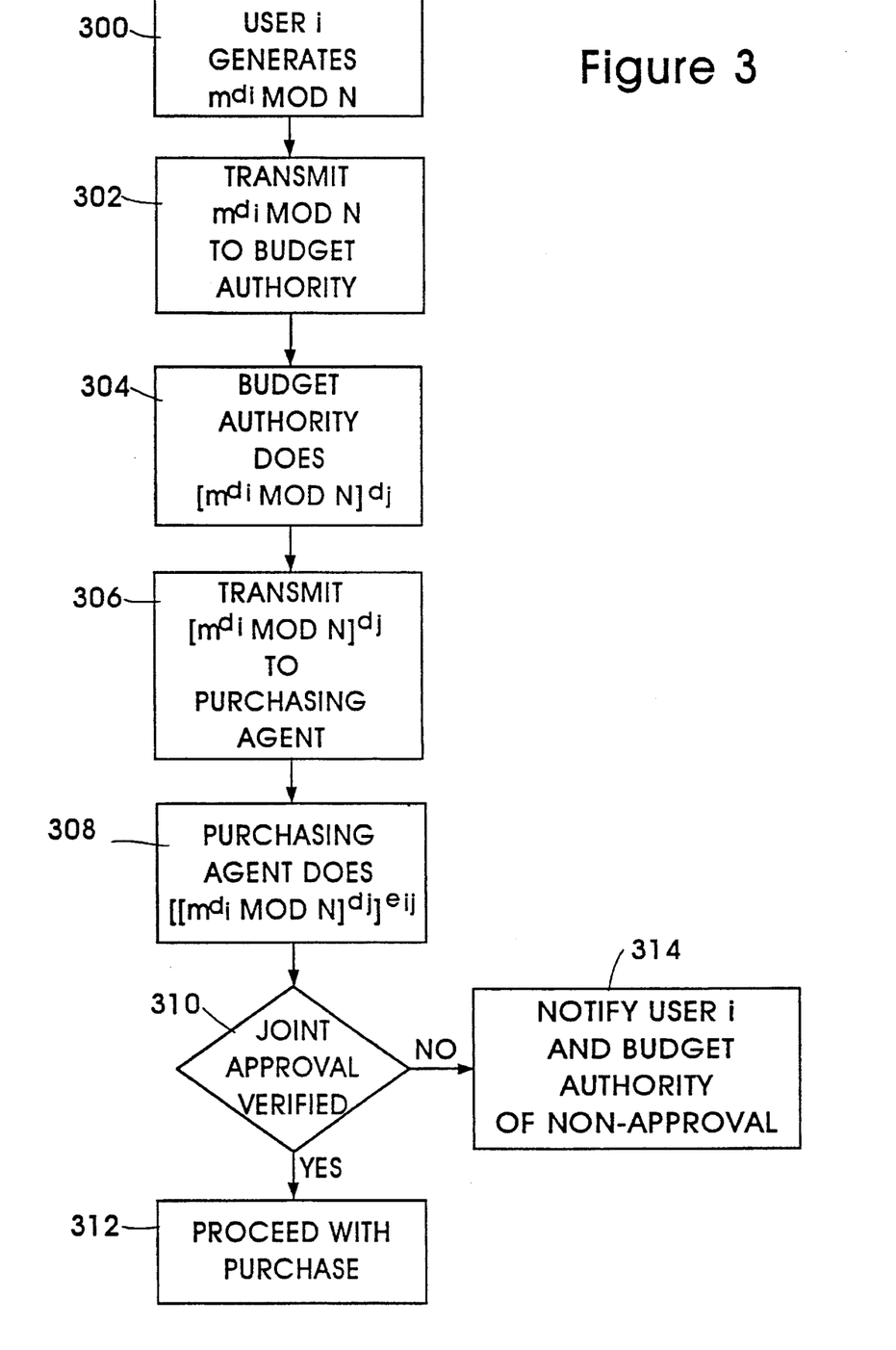
FIG. 3 illustrates joint signature formation in accordance with the present invention.

Joint signature authorization then proceeds as shown in FIG. 3. In step 300, user i, via station 30, signs the authorization m by applying user i's portion, $d_i$, of a joint private RSA key, d, to form the signature $s_i = m^{d_i} \mod N_i$, where N=pq is a modulus which is the product of two large primes p and q. In step 302, the signed message $s_i$ is sent by station 30 to the budget authority's server 24. If sufficient funds have been budgeted, in step 304, the server 24 forms the jointly signed message $s_{ij} = s_i^{d_j} \mod N_j$, where $d_j$ is the other portion of the private exponent key which has been entrusted to each of the servers 22–26. If there are insufficient funds, the server 24 can, for example, either forward the message to the purchasing agent's station 38 without applying the budget authority's signature $d_j$ or, alternatively, return the message to user i via station 30. If sufficient funds exist, the jointly signed message is forwarded to the purchasing agent. As indicated in step 306, server 24 transmits $m^{d_i d_j} \mod N_{ij}$ to the purchasing agent's station 38 via the necessary networks and communication lines shown in FIG. 1.

The purchasing agent's station retrieves the applicable public key from storage, for example on server 26, and in step 308 applies public exponent key $e_{ij}$ to the received transformed message $m^{d_i d_j} \mod N^{ij}$ to obtain $s_{ij}^{e_{ij}} \mod N = m^{d_i d_j e_{ij}} \mod N_{ij} = m$. If the message is determined in step 310 to have been properly recovered, the purchasing agent knows that the purchase has been jointly authorized by user i and the budgeting department and will therefore proceed in step 312 with the procurement. If the message is not properly recovered by the application of the public exponent key, the purchasing agent is not authorized to proceed with the purchase and station 38 transmits a notice that the purchase has not been properly authorized back to station 30 and server 24 in step 314.

Figure 4:
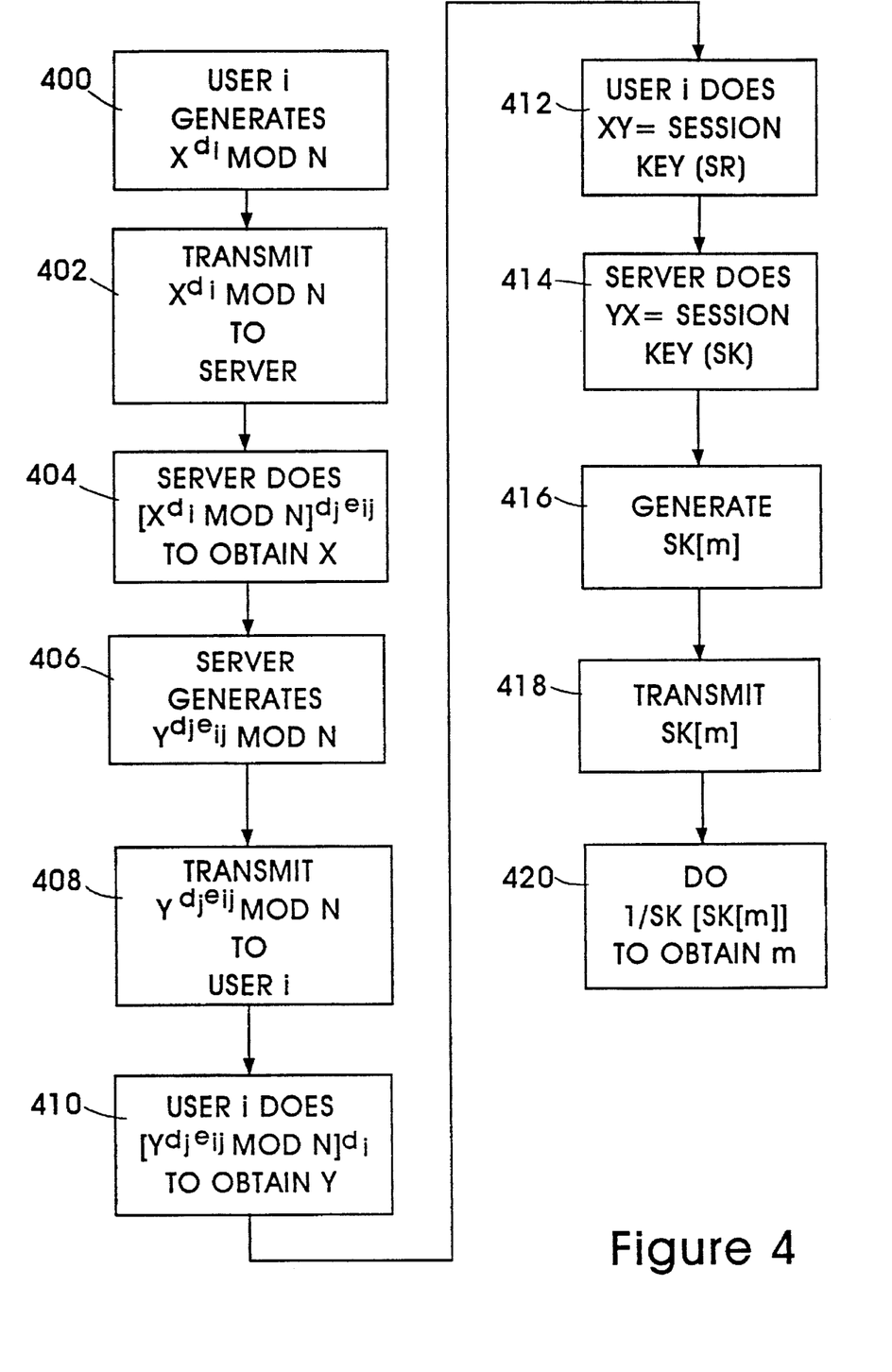
FIG. 4 illustrates a session key agreement in accordance with the present invention.

To establish a secure channel between the user i and the server 22, a session key, sk, is formed by user i and server 22 which is not known to any other party. The session key agreement is established using the private key portions $d_i$ and $d_j$ and the public key $e_{ij}$. As shown in FIG. 4, in step 400 the user i picks a number x and using station 40 signs a message containing the number x by generating the signed message $s_{i=x}^{d_i} \mod N_i$. In step 402 $s_i$ is transmitted to server 22 via, for example, station 40 over LAN 16, subscriber line 17 and network 12 of FIG. 1. The server 22, in step 404, exponentiates $s_i$ with its private key portion $d_j$ and with the public key $e_{ij}$ to obtain $x = s_i^{d_j e_{ij}} \mod N = x^{d_i d_j e_{ij}} \mod N_{ij}$. In step 406 the server 22 picks a number y and signs a message containing the number y by generating the signed message $s_j = y^{d_j e_{ij}} \mod N_j$. In step 408 $s_j$ is transmitted to the user station 40. The user station 40, in step 410, exponentiates $s_j$ with the user's private key portion $d_i$ to obtain $y = s_j^{d_i} \mod N_j = y^{d_j d_i e_{ij}} \mod N_{ij}$.

Now, both the user station 40 and server 22 are in possession of x and y. A session key sk is then formed by both user station 40 in step 412 and server 22 in step 414 by multiplying x and y to obtain sk=xy mod N. Then, in step 416 a plain text message m is generated and, in step 418, transmitted between station 40 and server 22. The message is encrypted in step 416 using the encipherment function f and the session key sk to obtain the cipher text message c=f (m,sk) prior to transmission. Decryption is performed using a reciprocal function in step 420. Thus, the session key agreement has been established using a private key portion $d_i$ which is of a short length as previously described.

The above-described system and method have a number of very significant advantages. The user i uses a small secret key $d_i$ which is of the order $O(n^{\log(n)/\log\log(n)})$, where n=log N and is a security parameter. For example, if the modulus N has 512 bits, the private key portion $d_i$ can be between 56 and 72 bits. A key of such a length, approximately 8 characters, is short enough to be easily memorize by a user and, if properly chosen, long enough to make off-line password guessing attacks impractical. The length of the public key $e_{ij}$ is approximately equal to log $(\lambda N)$. The servers 22–26 are required to perform only one exponentiation to verify the user's identity or form a joint signature on a document. The system and method are especially suitable for use in the case where the user i must memorize $d_i$ because, for example, no smart card for storing $d_i$ is available. Further, the system and method provide secure controlled access to the servers 22–26. This is because full RSA security is provided even though $d_i$ is only 56 to 72 bits in length. Thus it is extremely difficult to break through the system's security in a timely fashion. However, it will be understood that reducing the size of the private key portion $d_i$ below the relationship discussed above, will result in a system which offers less security than conventional RSA systems.

As describe above, the present invention provides a system and method for improving conventional RSA public cryptosystems so that the user is only required to use a short secret key while still retaining system security equivalent to conventional RSA systems. Using the described system and method, the identity of the user can be easily verified. The joint signature of documents by two or more users is also facilitated. Additionally, the system and method enhance the users' ability to obtain session key agreement.

We claim:

1. A method for using an RSA cryptosystem comprising the steps of:

generating a private exponent key, having an associated modulus N of a predetermined bit length, and a corresponding public exponent key;

dividing said private exponent key into a first private key portion and a second private key portion, wherein said first private key portion has a bit length of no greater than fifteen percent of the bit length of the associated modulus N but not less than 56 bits;

disclosing said first private key portion to a first user; and disclosing said second private key portion to a selected one or more other users of the RSA system.

2. A method according to claim 1, wherein said private exponent key is comprised of a private exponent and the modulus N which is a product of two large prime numbers, and said public exponent key is comprised of a public exponent and the modulus N.

3. A method according to claim 1, wherein said bit length of said first private key portion is between 56 and 72 bits.

4. In an RSA cryptosystem in which a first user is associated with a private exponent key having an associated modulus N of a predetermined bit length, and a corresponding public exponent key, said private exponent key being divided into a first private key portion and a second private key portion, the first private key portion being available to the first user, and the second private key portion being available to a second user of the RSA system, a method for user identity verification comprising the steps of:

transforming a message with said first private key portion; and recovering the message by applying thereto the second private key portion and public exponent key;

wherein said first private key portion has a bit length no greater than fifteen percent of the modulus N but not less than 56 bits.

5. A method according to claim 4, further comprising the steps of:

transforming a message with said second private key portion; and recovering the message by applying thereto the first private key portion and public exponent key.

6. A method according to claim 4, wherein said bit length of said first private key portion is between 56 and 72 bits.

7. In an RSA cryptosystem in which a first user is associated with a private exponent key, having an associated modulus N of a predetermined bit length, and a corresponding public exponent key, said private exponent key being divided into a first private key portion and a second private key portion, the first private key portion being available to the first user, and the second private key portion being available to a second user of the RSA system, a method for user identity verification comprising the steps of:

transforming a message with said first private key portion and public exponent key; and recovering the message by applying thereto the second private key portion;

wherein said first private key portion has a bit length no greater than fifteen percent of the bit length of the modulus N but not less than 56 bits.

8. A method according to claim 7, further comprising the steps of:

transforming a message with said second private key portion and public exponent key; and recovering the message by applying thereto the first private key portion.

9. A method according to claim 7, wherein said bit length of said first private key portion is between 56 and 72 bits.

10. In an RSA cryptosystem in which a first user is associated with a private exponent key, having an associated modulus N of a predetermined bit length, and a corresponding public exponent key, said private exponent key being divided into a first private key portion and a second private key portion, the first private key portion being available to the first user, the second private key portion being available to a second user of the RSA system, and the user public exponent key being available to a third user of said RSA system, a method for forming joint signatures comprising the steps of:

transforming a message with the first private key portion to form a signature of the first user on the message;

further transforming said message by applying thereto said second private key portion to form a signature of the second user on said message, thereby resulting in a jointly signed message; and inverting said jointly signed message by applying thereto said public exponent key, thereby verifying that the message was signed by both private key portions;

wherein the first private key portion has a bit length no greater than fifteen percent of the bit length of the modulus N but not less than 56 bits.

11. A method according to claim 10, further comprising the steps of:

transforming a second message with the second private key portion to form a signature of the second user;

further transforming said second message by applying thereto said first private key portion to form a signature of said first user on said message, thereby resulting in a jointly signed message; and inverting said jointly signed message by applying thereto said public exponent key, thereby verifying that the message was signed by both private key portions.

12. A method according to claim 10, wherein said bit length of said first private key portion is between 56 and 72 bits.

13. In an RSA cryptosystem in which a first user is associated with a private exponent key and a corresponding public exponent key, said private exponent key being divided into a first private key portion and a second private key portion, the first private key portion being available to the first user, the second private key portion being available to a second user of the RSA system, and the public exponent key being available to said first and second users, a method for forming a joint symmetric session encryption key comprising the steps of:

transforming a first number with the first private key portion;

recovering said first number by applying thereto said second private key portion and said public exponent key;

transforming a second number with the second private key portion and the public exponent key;

recovering said second number by applying thereto said first private key portion;

multiplying the first number and the second number to form the joint symmetric session encryption key; and     using said session encryption key to secure communications between said first user and said second user;

wherein said private exponent key has an associated modulus N, and said first private key portion has a bit length of (i) no greater than fifteen percent of a bit length of the modulus N and (ii) not less than 56 bits.

14. A method according to claim 13, wherein said private exponent key is comprised of a private exponent and the modulus N which is a product of two large prime numbers, and said public exponent key is comprised of a public exponent and the modulus N.

15. A method according to claim 13, wherein said first user key portion has a bit length between 56 and 72 bits.

16. An RSA cryptosystem comprising:

means for generating a private exponent key, having an associated modulus N of a predetermined bit length, and a corresponding public exponent key for a user of said RSA system;

means for dividing said private exponent key into a first private key portion and a second private key portion, wherein said first private key portion has a bit length of no greater than fifteen percent of the bit length of the modulus N but not less than 56 bits;

means for storing said public exponent key and said second private key portion wherein access to said second private key portion is selectively allowed; and     means for retrieving the second private key portion and the public exponent key from said storing means.

17. A system according to claim 16, wherein said private exponent key is comprised of a private exponent and the modulus N which is a product of two large prime numbers, and said public exponent key is comprised of a public exponent and the modulus N.

18. A system according to claim 16, wherein said bit length of said first private key portion is 56 and 72 bits.

19. An RSA cryptosystem in which a user is associated with a private exponent key and a corresponding public exponent key, said private exponent key being divided into a first private key portion and a second private key portion, the first private key portion being available to a first user, comprising:

means for storing said second private key portion and public exponent key;

means for retrieving said second private key portion and public exponent key from said storing means, wherein retrieval of said second private key portion is selectively allowed;

means for transforming a first message with said first private key portion;

means for transforming a second message with said second private key portion and public exponent key; and     means for recovering said first message by applying thereto the first private key portion;

wherein said user private exponent key has an associated modulus N of a predetermined bit length and the first private key portion has a bit length of no greater than fifteen percent of the bit length of the associated modulus N but not less than 56 bits.

20. A system according to claim 19, further comprising:

means for transmitting said first and second messages from said transforming means to said recovering means; and     means for verifying that each of the messages has been properly recovered.

21. A system according to claim 20, further comprising:

means for transforming a third message with said first private key portion;

means for further transforming said third message by applying said second private key portion to said third message to form a jointly signed message; and     means for recovering said jointly signed message by applying thereto said public exponent key.

22. A system according to claim 21, further comprising:

means for transmitting said third message from said transforming means to said further transforming means; and     means for transmitting said jointly signed message from said further transforming means to said recovering means.

23. A system according to claim 22, further comprising:

means for generating a first number and transforming said first number with said first private key portion;

means for generating a second number and transforming said second number with said second private key portion and the public exponent key;

means for recovering said first number by applying thereto the second private key portion and the public exponent key;

means for recovering said second number by applying thereto the first private key portion;

means for multiplying the first number and the second number to form a symmetric session encryption key; and     means for encrypting one or more messages transmitted between a first user and a second user using said session encryption key.

24. A system according to claim 19, wherein said private exponent key is comprised of a private exponent and a modulus N which is a product of two large prime numbers, and said public exponent key is comprised of a public exponent and the modulus N.

25. A system according to claim 19, wherein said first private key portion has a bit length between 56 to 72 bits.

26. A method according to claim 2, wherein said plurality of numbers used to compute the modulus N are not known to users of the system.

27. A method according to claim 14, wherein said plurality of numbers used to compute the modulus N are not known to users of the system.

28. A system according to claim 17, wherein said plurality of numbers used to compute the modulus N are not known to users of the system.

29. A system according to claim 24, wherein said plurality of numbers used to compute the modulus N are not known to users of the system.

30. A method according to claim 1, wherein the private exponent key has a bit length greater than the bit length of the first private key portion.

31. A method according to claim 30, wherein the private exponent key has a bit length of at least twenty-five percent of the bit length of the associated modulus N.

32. A method according to claim 4, wherein the private exponent key has a bit length greater than the bit length of the first private key portion.

33. A method according to claim 32, wherein the private exponent key has a bit length of at least twenty-five percent of the bit length of the associated modulus N.

34. A method according to claim 7, wherein the private exponent key has a bit length greater than the bit length of the first private key portion.

35. A method according to claim 34, wherein the private exponent key has a bit length of at least twenty-five percent of the bit length of the associated modulus N.

36. A method according to claim 10, wherein the private exponent key has a bit length greater than the bit length of the first private key portion.

37. A method according to claim 36, wherein the private exponent key has a bit length of at least twenty-five percent of the bit length of the associated modulus N.

38. A method according to claim 13, wherein the private exponent key has a bit length greater than the bit length of the first private key portion.

39. A method according to claim 13, wherein the private exponent key has a bit length of at least twenty-five percent of a bit length of an associated modulus N and the first private key portion has a bit length no greater than fifteen percent of the bit length of said associated modulus N.

40. A system according to claim 16, wherein the private exponent key has a bit length greater than the bit length of the first private key portion.

41. A system according to claim 40, wherein the private exponent key has a bit length of at least twenty-five percent of the bit length of the associated modulus N.

42. A system according to claim 19, wherein the private exponent key has a bit length greater than the bit length of the first private key portion.

43. A system according to claim 42, wherein the private exponent key has a bit length of at least twenty-five percent of the bit length of the associated modulus N.

* * * * *